B. C. MAXWELL.
MONEY HOLDER.
APPLICATION FILED JULY 15, 1908.

1,036,873.

Patented Aug. 27, 1912.
3 SHEETS—SHEET 1.

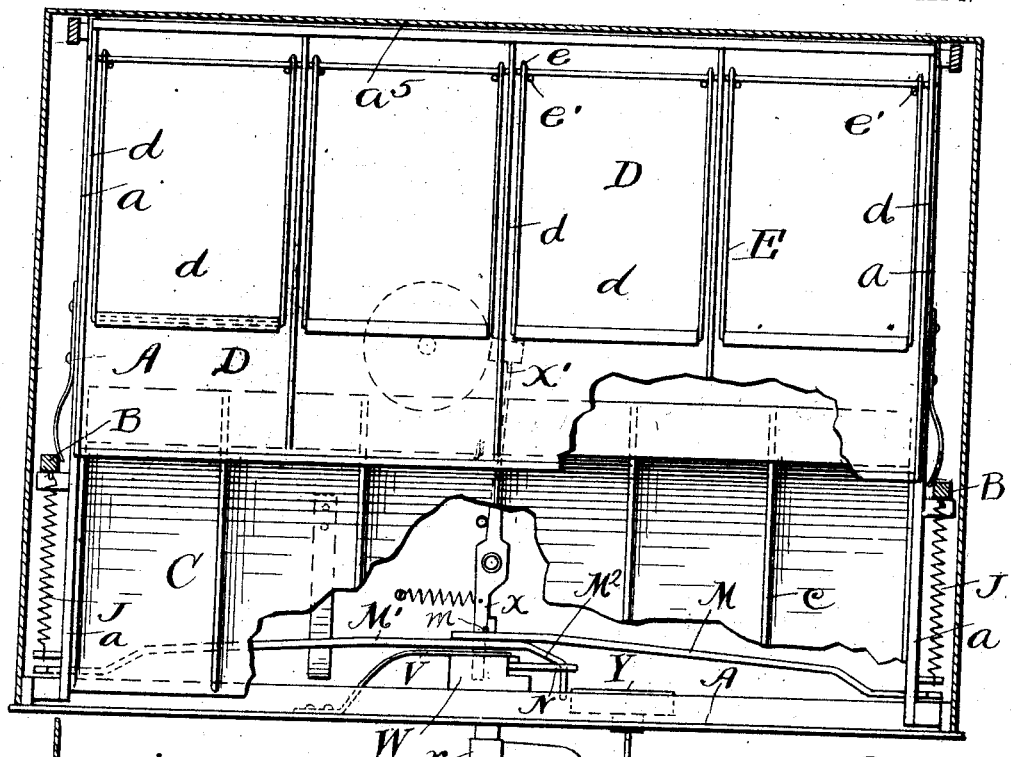
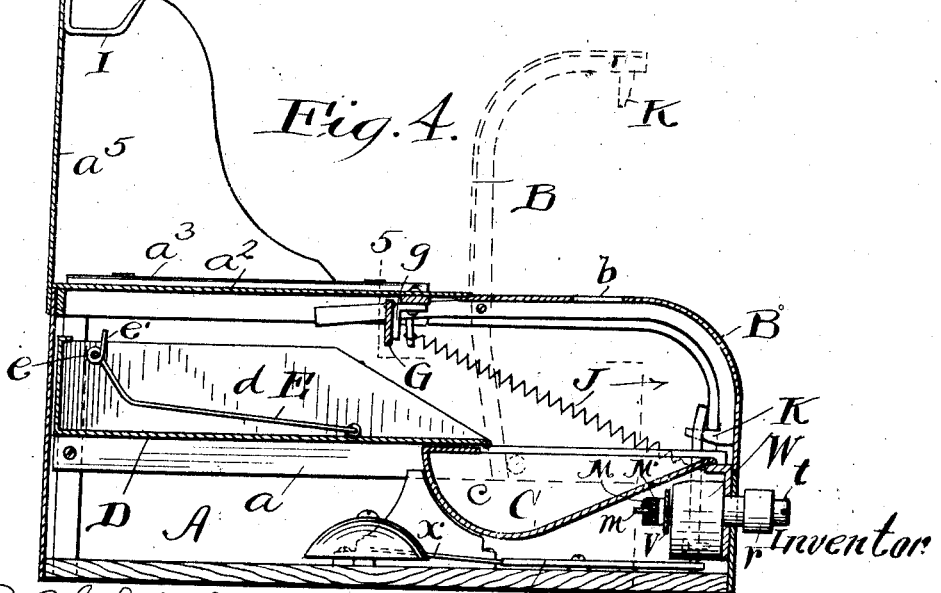

B. C. MAXWELL.
MONEY HOLDER.
APPLICATION FILED JULY 15, 1908.

1,036,873.

Patented Aug. 27, 1912.

3 SHEETS—SHEET 3.

Witnesses.
E. B. Fairchild
R. L. Brennan

Inventor.
Bert C. Maxwell
By Thurston & Woodward
Attorneys

UNITED STATES PATENT OFFICE.

BERT C. MAXWELL, OF CANTON, OHIO.

MONEY-HOLDER.

1,036,873.

Specification of Letters Patent.  Patented Aug. 27, 1912.

Application filed July 15, 1908. Serial No. 443,618.

*To all whom it may concern:*

Be it known that I, BERT C. MAXWELL, a citizen of the United States, residing at Canton, in the county of Stark and State of Ohio, have invented a certain new and useful Improvement in Money-Holders, of which the following is a full, clear, and exact description.

The money holder herein shown and described is an appliance designed especially with reference to its use in connection with a system employed for transacting cash business in retail stores. In conducting a business according to the system referred to, each clerk, when he makes a sale of one or several articles, makes out duplicate sales tickets showing the articles purchased, the prices to be paid therefor, and the total. One of these tickets is given to the customer and the other is retained in the store, usually by the cashier. These retained sales tickets serve several useful purposes which need not be recited here. When they are used in association with a money holder in the manner hereinafter specified, they serve as the means for checking up the money in the money holder. When the described money holder is used in the manner to be most useful in connection with said system, each clerk is provided with a money holder conveniently placed, and he alone uses it. He also files his sales tickets in some place conveniently related to it. Under such conditions an expensive cash register, is unnecessary,—in fact the cost of cash registers is prohibitive of their use in the manner stated,—that is to say, one for each clerk. Many of the safe-guards included in modern cash registers are not needed. What is needed is an inexpensive money holder into which the clerk may place the money he receives and from which he may take the change required with a minimum loss of time. It is also desirable that some means be provided in such money holder to baffle the attempts of a sneak thief attempting to steal money from it.

Figure 1:
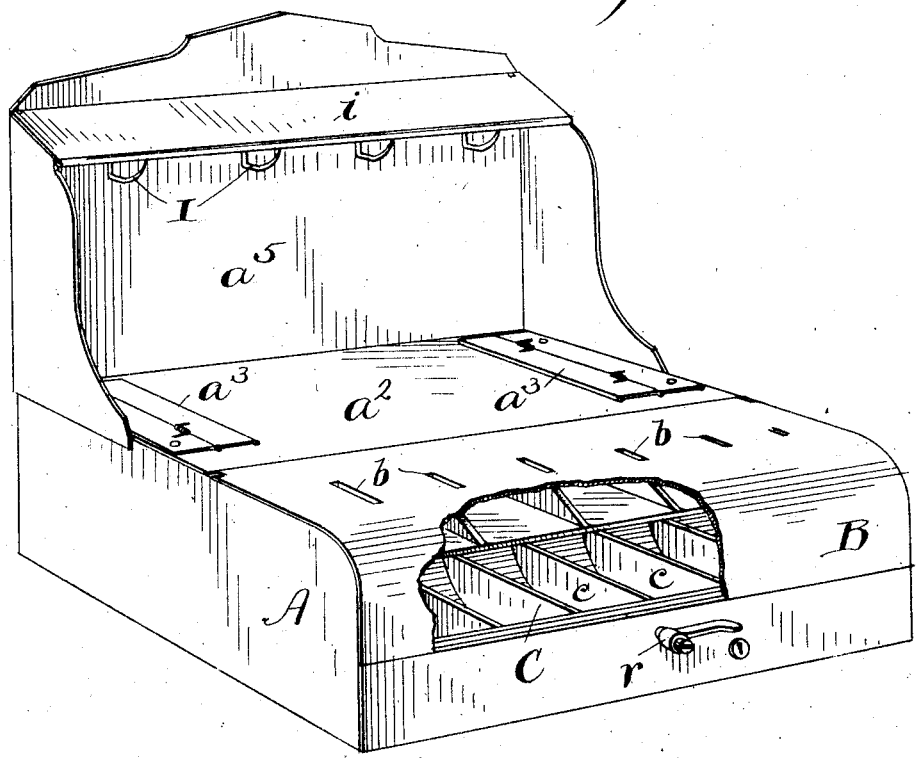
Figure 2:
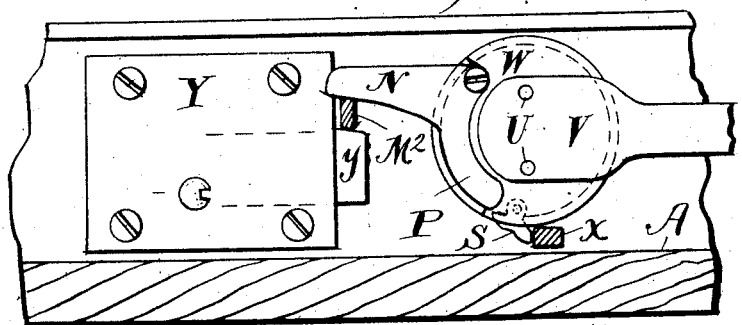
Figure 5:
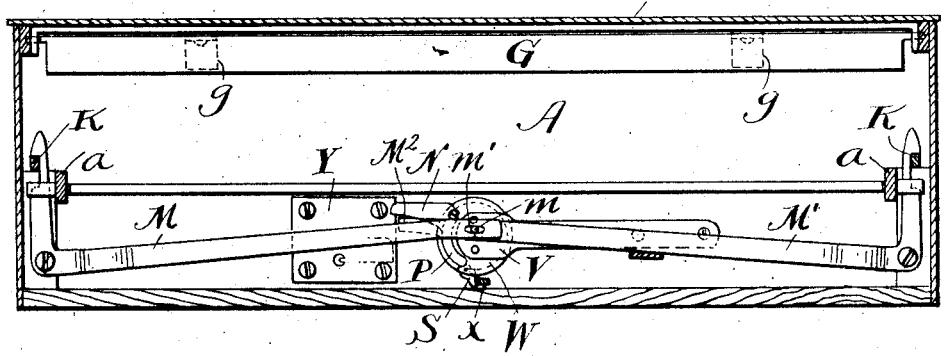
Figure 6:
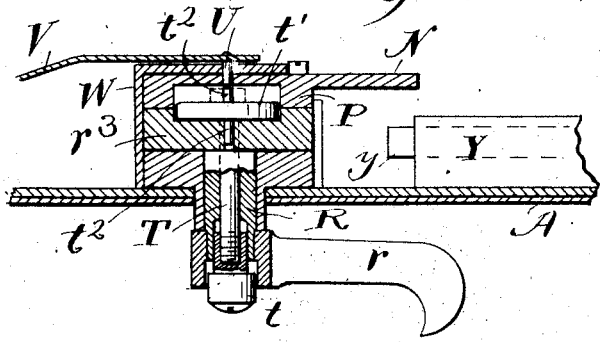
Figures 7, 8:
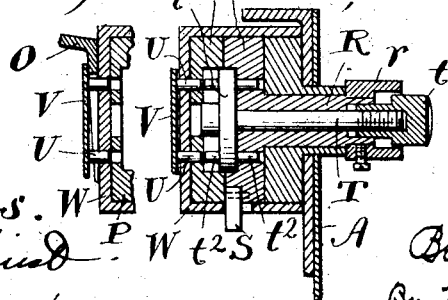

These requirements are realized in a full and practical degree in the money holder hereinafter described and claimed and shown in the accompanying drawings in which;

Figure 1 is a perspective view (with the hinged cover partly broken away) of a money holder embodying the invention. Fig. 2 is an enlarged view from the inside of the case of the latch operating mechanism and a lock for rendering it inoperative. Fig. 3 is a sectional plan view in a plane just below the top plate of the case. Fig. 4 is a sectional side elevation of the money holder. Fig. 5 is a sectional view looking from the rear, the section being taken in the plane of the broken line 5—5 on Fig. 4. Fig. 6 is a sectional plan view of the latch operating and controlling mechanism. Fig. 7 is a vertical sectional view of the same mechanism; and Fig. 8 is a similar section showing only the rear part of the mechanism shown in Fig. 7 when a wedge block has been inserted so as to hold the latch mechanism in position to be operated by the manipulation of the handle $r$.

The money holder includes a box-like case A, made preferably of metal, having a hinged cover B adapted to be normally held closed, but capable of being easily and quickly opened when required. Within the case is a coin holding tray C divided into various compartments $c$ for coins of different denominations. This coin holder is removable, but is intended to be held within the case directly beneath the cover B in which are various slots $b$ of suitable sizes to permit various coins to be dropped through them,—these slots being placed directly over the various coin compartments referred to. Therefore, if in payment of any purchase, the exact change in coin is given to the clerk, it is not necessary for him to open the holder. He simply drops the coins through their appropriate slots and they fall into the compartments intended to receive them.

Within the casing is a bill holding tray D divided into a suitable number of compartments $d$. This tray rests upon suitable horizontal rails $a$ secured to the sides of the case. It normally occupies a position behind the coin holder but it may be slid forward when desired. The front end of the bill holder is, however, conveniently placed with reference to the opening in the case which the cover closes, and the various compartments $d$ have no front wall. Therefore it is convenient for the clerk when he opens the cover to take the top bill out of any compartment without moving the bill tray forward. There is, however, a bill holding lever E associated with each compartment $d$; these levers being, as shown, in the form of wire bails provided with hinged loops $e$ through which a single pivoting rod F passes. The ends of the wire extend upward and furnish the lever arms $e'$ which normally lie behind a transverse bar G pivoted along its upper edge and hanging freely from its pivot; there being in front of this bar a fixed shoulder $g$ which prevents its swinging forward past the substantially vertical position. The bar is, however, free to swing rearwardly. When, therefore, the bill holder has been placed in the case, and it is being pushed back, the angle arms $e'$ will strike this bar G and swing it backward and pass it. When the tray is moved forward, however, this bar will be struck by all of the upwardly extended lever arms $e'$ and thereby all of the bill holding levers will be raised to release the bills in the several compartments. This makes it convenient for the clerk to put a bill into a compartment or to take several bills from any compartment. The clerk may, however, lift any lever he chooses with his finger to enable him to put in or take a bill from a compartment without pulling the tray D forward.

The opening in the case is partly in front and partly in the top of the case and, as before stated, it is closed by a hinged cover appropriately shaped. Behind the cover is a flat portion $a^2$ of the case which serves as a desk on which may be held, by suitable spring actuated clamping plates $a^3$, the clerk's total sales record. The cover is normally under the influence of a force illustrated by springs J tending to open it, but it is normally held closed by latches. In the form shown, the latch fingers K, K, are carried by the cover near side edges thereof.

The movable latch members comprise two bent levers M, M' hinged to the front of the case. Their inner ends cross one another and are connected by a pivot pin $m$ which is secured to one lever and passes through a short slot $m'$ in the other. An arm $M^2$ of one of these levers is prolonged beyond its pivotal connection with the other lever, and is bent forward under an actuating lever N. This lever is secured to a rotating disk P which normally is disconnected from, but is adapted to be very quickly connected with a rock shaft R which extends through the front of the case and has an operating lever $r$ secured to its outer end. When the disk P is connected with this rock shaft the clerk, by merely pushing down on said lever $r$, causes the rocking of the latch lever M, M' and the release of the cover,—which thereby automatically opens.

The construction by which the latch lever operating arm and the lever outside the case may be operatively connected or disconnected is shown in Figs. 6-8. A disk $r^3$ is fixed to the inner end of the rock shaft R. An endwise movable stud T extends axially through the rock shaft projecting from both ends thereof. A finger piece $t$ is screwed into the projecting outer end of this stud,—said finger piece being of such diameter that it may engage with the outer end of the rock shaft R and so limit the endwise inward movement of said stud. On the inner end of the stud is a disk $t'$ carrying two pins $t^2$ extending in a direction parallel with the stud, and projecting both forwardly and backwardly from the disk. The rearward extensions enter holes in the disk $r^3$ which is carried by the rock shaft R. The forward ends of these pins $t^2$ normally engage with the ends of other pins U alined with them. These other pins U lie, and are movable in holes in the disk P which carries the latch lever operative arm N and also in the holes in the rear walls of the casing W which surrounds these various disks, etc., within the money holding case. This casing W is non-rotatable when secured to the front wall of the money case. The pins U referred to are engaged by a spring V tending to push them forward and keep them in the holes in the disk P.

When the clerk desires to open the cover of the case he presses inward on the finger piece $t$ on the outer end of the stud T, thereby moving it and the disk $t'$ carrying the pins $t^2$. These pins push the pins U out of the holes in the disk P and take their places. When now the rock shaft R is turned by pressure on arm $r$, the disk P must turn with it, and thereby the latch levers M, M' are rocked and the case cover released. If, however, the arm $r$ on rock shaft R is operated without first pushing in the central stud T, the disk P is not moved, but the other disk $r^3$ is turned. This disk $r^3$ carries a snubbing pawl S which engages with a spring actuated lever $x$ having at its rear end a bell hammer $x'$. When the rock shaft R is rocked this bell hammer lever is rocked, and released and thereby an alarm is rung on the bell whether the case cover B is or is not released. The ringing of this bell is intended to call the attention of a clerk to the fact that his money holder is being tampered with, and it is expected that if a thief is attempting to get into the money drawer he will abandon his efforts and run away. If, however, he is not frightened off by the ringing of the alarm, the action of the outer lever $r$ is as if the device was broken. Every time he moves this lever up and down the alarm will be rung, and it is not thought that he will spend much time in trying to figure out what the reason is that he fails to open the case. When the lever $r$ and associated parts return to their normal position, a flat spring V pushes pins U forward into the holes in disk P, again putting the parts in the position when the stud T must be pushed in before the cover can be unlatched.

If it is desired to put the device in a connection where the mere movement of lever $r$ will unlatch the cover; a wedge O may be placed between the spring V and the rear wall of the casing W.

The vertical rear wall $a^5$ of the case is carried up beyond the table portion $a$ and a number of filing hooks I project forward therefrom; and it is upon these hooks that the clerk impales his sales tickets. In order to prevent him, in the hurry of business, from pricking his finger, a light plate $i$ is hinged so as to extend over the point of the hook; but this plate may be very easily raised by the clerk when in the act of impaling his sales ticket thereon.

A lock Y of any suitable construction may be secured to the inside of the case in such position that when its bolt $y$ is shot out it goes beneath the end of lever $M^2$, and thereby prevents it from being moved in the cable releasing direction.

Having described my invention, I claim:

1. In a money holder, the combination of a case having a hinged cover and containing substantially horizontal guide-ways along its side, a bill holding tray slidably supported upon said guide-ways, said bill holding tray being divided into compartments, and bill holding levers pivoted to said tray and having upwardly extended arms, with a member with which said arms will engage when the bill tray is pulled forward.

2. In a money holder, the combination of a case having a hinged cover and containing substantially horizontal guide bars along its side, a bill holding tray slidably supported upon said bars, said bill holding tray being divided into compartments, bill holding levers pivoted to said tray and having upwardly extended arms, with a bar with which said arms will engage when the bill tray is pulled forward, said bar being loosely hung from a horizontal pivot, and a shoulder in front of said bar to engage therewith and limit its forward movement.

3. In a money holder, the combination of a case having a flat top portion, and spring clamps for holding a paper sheet thereon, and having an opening in front of said flat top, a hinged cover over said opening, mechanism for swinging said cover open, a latch for holding the cover closed, and mechanism for operating said latch.

In testimony whereof, I hereunto affix my signature in the presence of two witnesses.

BERT C. MAXWELL.

Witnesses:
JAMES J. GRANT,
HELEN D. WAGNER.